United States Patent [19]

Hodgson

[11] E Patent Number: Re. 31,887

[45] Reissued Date of Patent: May 14, 1985

[54] MOISTURE-VAPOR-PERMEABLE PRESSURE-SENSITIVE ADHESIVE MATERIALS

[75] Inventor: Martin E. Hodgson, Harlow, England

[73] Assignee: T. J. Smith & Nephew Limited, Kingston-upon-Hull, England

[21] Appl. No.: 157,288

[22] Filed: Jun. 6, 1980

Related U.S. Patent Documents

Reissue of:

[64] Patent No.: 3,645,835
Issued: Feb. 29, 1972
Appl. No.: 839,436
Filed: Jul. 7, 1969

[30] Foreign Application Priority Data

| | | | |
|---|---|---|---|
| Jul. 9, 1968 | [GB] | United Kingdom | 32588/68 |
| Oct. 22, 1968 | [GB] | United Kingdom | 50045/68 |
| Dec. 20, 1968 | [GB] | United Kingdom | 60756/68 |

[51] Int. Cl.[3] ..... B32B 7/10; B32B 27/40; A61F 13/02; A61L 15/06

[52] U.S. Cl. ..... 428/355; 428/343; 428/424.2; 428/424.4; 428/424.6; 128/132 D; 128/132 R; 128/156

[58] Field of Search ..... 428/343, 355, 424.2, 428/424.4, 424.6; 128/132 D, 132 R, 156

[56] References Cited

U.S. PATENT DOCUMENTS

| | | | |
|---|---|---|---|
| Re. 24,906 | 12/1960 | Ulrich . | |
| 2,646,771 | 7/1953 | Salditt . | |
| 2,647,100 | 7/1953 | Salditt . | |
| 2,650,212 | 8/1953 | Windemuth et al. . | |
| 2,734,503 | 2/1956 | Doyle | 128/156 |
| 2,750,315 | 6/1956 | Tierney | 161/167 |
| 2,750,316 | 6/1956 | Bemmels | 161/167 |
| 2,750,942 | 6/1956 | Robson | 128/156 |
| 2,804,073 | 8/1957 | Gallienne et al. . | |
| 2,870,129 | 1/1959 | Merriman . | |
| 2,871,218 | 1/1959 | Schollenberger | 260/45.4 |
| 2,940,868 | 7/1960 | Patchell . | |
| 2,949,443 | 8/1960 | Merriman et al. . | |

(List continued next page.)

FOREIGN PATENT DOCUMENTS

| | | |
|---|---|---|
| 152984 | 11/1950 | Australia . |
| 153276 | 4/1952 | Australia . |
| 260426 | 4/1963 | Australia . |
| 260604 | 4/1963 | Australia . |
| 273966 | 4/1964 | Australia . |
| 663779 | 8/1938 | Fed. Rep. of Germany . |
| 835037 | 2/1952 | Fed. Rep. of Germany . |
| 856786 | 2/1955 | Fed. Rep. of Germany . |
| 1077382 | 12/1960 | Fed. Rep. of Germany . |
| 1106959 | 11/1964 | Fed. Rep. of Germany . |

(List continued next page.)

OTHER PUBLICATIONS

*The Lancet*, "Experiments with Occlusive Dressings of a New Plastic" by J. P. Bull et al., 8/48 No. 6519, pp. 213-215.

*German Plastics Practice*, 1946, pp. 284-285, 292-297, 372-374.

G. Aldous, D. Falconer, W. Aldous, "Terrell on the Law of Patents", London 1965, pp. 402, 403, 412 and 413.

(List continued next page.)

*Primary Examiner*—Alexander S. Thomas
*Attorney, Agent, or Firm*—Jacobs & Jacobs

[57] ABSTRACT

This invention relates to a moisture-vapor-permeable pressure-sensitive adhesive material for use on animal skin and nails, e.g. a surgical drape, suture strip or sheet, adhesive dressing, bandage, plaster, strapping tape, decorative nail covering, or decorative cosmetic product. The adhesive material comprises a backing material and a pressure-sensitive adhesive on at least substantially the whole of the body adhering portion of at least one surface of said backing material, both said backing material and said adhesive being moisture-vapor-permeable and unaffected by water and at least one of said backing material and said adhesive comprising a synthetic polymer and *both said backing material and said adhesive* being continuous and nonpermeable to liquid water, said adhesive material having a moisture vapor permeability of at least 300 g/sq. meter/24 hours/40° C./80 percent RH.

16 Claims, 7 Drawing Figures

U.S. PATENT DOCUMENTS

| | | | |
|---|---|---|---|
| 2,973,286 | 2/1961 | Ulrich | 161/406 |
| 2,979,061 | 4/1961 | Greenman et al. | 132/73 |
| 3,007,899 | 11/1961 | Urs . | |
| 3,039,893 | 6/1962 | Bannigan et al. . | |
| 3,085,024 | 4/1963 | Blackford . | |
| 3,121,021 | 2/1964 | Copeland . | |
| 3,260,260 | 7/1966 | Questel | 128/132 |
| 3,269,903 | 8/1966 | Von Fieandt et al. . | |
| 3,307,544 | 3/1967 | Gander et al. . | |
| 3,313,647 | 4/1967 | Weymann . | |
| 3,364,063 | 1/1968 | Satas . | |
| 3,367,329 | 2/1968 | Dibellus . | |
| 3,374,134 | 3/1968 | Waldman . | |
| 3,419,006 | 12/1968 | King . | |
| 3,483,018 | 12/1969 | Waldman . | |
| 3,523,846 | 8/1970 | Muller . | |
| 3,526,224 | 9/1970 | Potts | 128/156 |
| 3,645,835 | 2/1972 | Hodgson . | |
| 648733 | 1/1951 | United Kingdom . | |
| 692578 | 6/1953 | United Kingdom . | |
| 749739 | 5/1956 | United Kingdom . | |
| 749743 | 5/1956 | United Kingdom . | |
| 761840 | 11/1956 | United Kingdom . | |
| 761783 | 11/1956 | United Kingdom . | |
| 777949 | 7/1957 | United Kingdom . | |
| 778944 | 7/1957 | United Kingdom . | |
| 788944 | 7/1957 | United Kingdom . | |
| 799424 | 8/1958 | United Kingdom . | |
| 830177 | 3/1960 | United Kingdom . | |
| 819635 | 5/1960 | United Kingdom . | |
| 836097 | 6/1960 | United Kingdom . | |
| 872457 | 7/1961 | United Kingdom . | |
| 951468 | 3/1964 | United Kingdom . | |
| 987933 | 3/1965 | United Kingdom . | |
| 989760 | 4/1965 | United Kingdom . | |
| 1044828 | 10/1966 | United Kingdom . | |
| 1075939 | 7/1967 | United Kingdom . | |
| 1088992 | 10/1967 | United Kingdom . | |
| 1094353 | 12/1967 | United Kingdom . | |
| 1106479 | 3/1968 | United Kingdom . | |
| 1226841 | 3/1971 | United Kingdom . | |
| 1280631 | 7/1972 | United Kingdom . | |
| 1341605 | 12/1973 | United Kingdom . | |

FOREIGN PATENT DOCUMENTS

| | | |
|---|---|---|
| 1228030 | 4/1966 | Fed. Rep. of Germany . |
| 1253414 | 3/1968 | Fed. Rep. of Germany . |
| 1263989 | 3/1968 | Fed. Rep. of Germany . |
| 998187 | 1/1952 | France . |
| 1025117 | 3/1959 | France . |
| 1097368 | 5/1960 | France . |
| 1288390 | 12/1962 | France . |
| 1407951 | 6/1965 | France . |
| 1490130 | 7/1967 | France . |
| 54072 | 5/1957 | India . |
| 1090061[U] | 5/1961 | Japan . |
| 2559961[U] | 9/1961 | Japan . |
| 394728 | 4/1964 | Japan . |
| 6509385 | 1/1966 | Netherlands . |
| 6611735 | 2/1967 | Netherlands . |
| 105336 | 7/1961 | Norway . |
| 109496 | 7/1966 | Norway . |
| 312196 | 3/1972 | Sweden . |
| 332999 | 9/1958 | Switzerland . |
| 557473 | 10/1949 | United Kingdom . |

OTHER PUBLICATIONS

Th. T. Stetz, J. F. Smith, (B. F. Goodrich Chemical Co.), "Thermoplastic Polyurethane Solutions", Jan. 1964.

Modern Plastics 1963, 40 (9), 143, 144, 146, 149, 152, 154 and 203.

Modern Plastics 1966, 44 (7), 139-142, 144, 146, 150, 194, 196, 198, 200, 202, 205, 206, 208, 210 and 213.

Esarove, D., "Designing with Thermoplastic Polyurethane Sheet and Film", S.P.E. Journal, Oct. 1965, 1184-1188.

Th. T. Stetz, J. F. Smith, (B. F. Goodrich Chamical Co.), "Les Proprieters et les Applications de Dissolutions de Polyurethanes Thermoplastiques", Syndicat National de Caoutchouc, Informations Techniques, No. 113, Jul. 1965.

Handbook of Adhesives, 1965, 400-408.

Adhesion 1963, (12), 551-558.

"Unique Properties of Thermoplastic Polyurethane Solutions Which Permit Wide-Spread Application", Rubber Age 1965, 74-79.

Techniques for Use of a New Dressing, A Moisture Vapor Permeable Film, B. A. Montgomery, JET 8(6), pp. 26-29.

Moist Wound Healing Under a Vapor Permeable Membrane, J. C. Alper et al, Jnl. of the American Academy of Dermatology, 1983, vol. 8, 39, pp. 347-353.

Use of a Semipermeable Polyurethane Membrane as a Dressing for Split-Skin Grant Donor Sites, M. I. Dinner et al, Plastic and Reconstructive Surgery, vol. 64, No. 1, (1979), pp. 112-114.

The Theoretically Ideal Donor Site Dressing, D. C. Birdsell et al, Annuals of Plastic Surgery, vol. 2, No. 6, (1979), pp. 535-537.

Op-Site, A New Wound Dressing with Particular Benefits for Dermal Lesions, Margaret Reese et al, Clinical Report, Kern Medical Center, Bakersfield, California.

Scalp as Skin Graft Donor Site: Rapid Reuse with Synthetic Adhesive Moisture Vapor Permeable Dressings, A. Banrett et al, The Journal of Trauma, vol. 23, No. 2, (1983), pp. 148-151.

Physiological Activity from an Occlusive Wound Dressing, S. Randolph May, reprinted from Wound Healing Symposium; Oxford: The Medicine Publishing Foundation, (1983), pp. 35-51.
Use of Transparent Polyurethane Dressing (Op-Site) for Central Venous Catheter Care, Marilyn Jarred, American Society for Parenteral and Enteral Nutrition, 4th Clinical Congress, Chicago, (1980).
Concerning the Use of OpSite as a Dressing, J. Greco et al. J. Chirurg. Tours Centre-Ouest, (1977), 11 3 (with translation).
New Treatment for Pressure Sores, M. Chrisp, Nurs. Times, 1977, 73 (31), 1202-1205.
Treating Pressure Sores, M. A. Nasar, Br. Med. J., 7/17/78, p. 624.
Burn Management-A Changing Scene, D. H. Walker, Suit-Afrikanse Tydskrif Vir Chirurgie, (1978), 16 (1) 65.
Management of Pressure Areas-A Nurse's Plea, A MacKinnon, The Lamp, Jul. 1978.
The Use of Op-Site in Plastic Surgery, M. Soussaline, et al, Ann. Chir. Plast., 1979, 24 (1), 96-98.
Breaking Down the Dry Barrier, M. A. Hammond, Nursing Mirror, 1979, 149 (18), 38-41.
The Application of OpSite to Donor Sites, Burns and Postoperative Wounds, Y. Cavlak, Akt. Traumatol., (1980), 10 311-6.
Op-Site, A New Method of Skin Closure, A Trial of its Use in Appendicectomy, A. C. Eaton, Br. J. Clin. Pract., 1980, 34 (6), 3 pages.
A Controlled Trial to Evaluate and Compare a Sutureless Skin Closure Technique (Op-Site Skin Closure) With Conventional Skin Suturing and Clipping in Abdominal Surgery, A. C. Eaton, Br. J. Surg., 1980, 67 857-860.
The Clinical Study on the Effect of Using Op-Site Surgical Drapes on Wounds of Dogs, A. C. Silvestre (thesis), Inst. Vet. Med., Gregoria Aran. Univ. Found, Mar. 1980.
An Improved Method of Wound Management for Pediatric Patients, T. E. Lobe, J. Ped. Surg., 1980, 15 (6), 4 pages.
Choosing the Best Method to Manage Pressure Ulcers, M. C. Ahmed, Nurses Drug Alert 1980, 4 (15), Special Report 113-120.
The Influence of Different Wound Dressings on the Healing of Split Skin Graft Donor Sites, E-H Ekstrom, et al, Symp. Wound Healing, Espo 1979, ed. Sundell, B., p. 97.
Op-Site Dressing: New Approach to Burn Care, W. Conkle, Emergency Nursing, 1981, 7 (4), 148-152.
Results of the Use of Op-Site in the Prophylactic and Curative Treatment of Pressure Sores in a General Surgical Ward, J. Callens, et al, J. Sci. Med. Lille,, 1981, 99 (2), 6 pages.
Op-Site-An Alternative in I.V. Dressings-A Survey Report, D. A. Cook, Nita, 1981, 4 (3), 218.
Hyperalimentation Dressings and Skin Flora, J. Schwartz-Fulton, et al, Nita, 1981, 4 (5), 354.
Use of Semipermeable Polyurethane Membrane for Skin Graft Dressings, L. F. Nahas, et al, Plast. Reconstr. Surg., 1981, 67 (6), 791-792.
Op-Site for Decubitus Care, M. C. Ahmed, Amer. J. Nurs., Jan. 1982, pp. 61-64.
Removable Subcuticular Skin Suture in Acute Appendicitis: A Prospective Comparative Clinical Trial, W. A. Buswell, Br. Med. J., 1982, 284 (6327).
Op-Site and the DHSS, B. Robertson, L. F. Tinckler, Br. Med. J., 1982, 285 (6340).
Securing Epidural Catheters, B. L. Duffy, Can. Anaesth. Soc. J., 1982, 29 (6), 636.
Use of OpSite as an Occlusive Dressing for Total Parenteral Nutrition Catheters, P. J. Palidar, et al, J. Parenteral Enteral Nutr., 1982, 6 (2), 150.
Surgical Wound Management With Op-Site-A New and Preferred Method, L. Tinckler, NATNews, 1982, (May) 14.
The Management of Pressure Sores, A Saving in Nursing Time, L. S. Kelly, Nurs. Focus, 1982.
Article from Biomedical Business International.

MOISTURE-VAPOR-PERMEABLE PRESSURE-SENSITIVE ADHESIVE MATERIALS

Matter enclosed in heavy brackets [ ] appears in the original patent but forms no part of this reissue specification; matter printed in italics indicates the additions made by reissue.

The present invention relates generally to adhesive materials for use on animal bodies particularly human bodies. Examples of such materials are: adhesive bandages, plasters, dressings, surgical drapes, and decorative cosmetic products.

Where adhesive materials are to be used on parts of animal bodies e.g., human bodies, it is desirable to have an adhesive material which is permeable to water vapor, but which is not permeable to liquid water, microorganisms and particles of dirt. These conditions are desirable in order to provide the desired covering without causing maceration due to occlusion of water from transepidermal water loss from the body. Many methods have been tried in order to obtain the results set out above. Methods at present in use involve the use of perforated, porous or microporous backing material having a porous or pattern spread adhesive layer. Such constructions however do not provide a barrier to low surface tension aqueous solutions, e.g., washing-up liquid (which will also allow bacteria to penetrate). Furthermore large holes in the material are not bacteria-proof and small holes are subject to being blocked by grease etc. Special processes are also needed to produce such materials.

According to the present invention there is provided a moisture-vapor-permeable pressure-sensitive adhesive material for use on animal skin and nails, comprising a backing material having a pressure-sensitive adhesive on at least substantially the whole of the body-adhering portion of at least one surface of said backing material, both said backing material and said adhesive being moisture vapor permeable and unaffected by water and at least one of said backing material and said adhesive comprising a synthetic polymer and being continuous and nonpermeable to liquid water, said adhesive material having a moisture vapor permeability of at least 300 g./sq. meter/24 hours/40° C./80 percent relative humidity (R.H.).

For the synthetic polymer used to form the continuous backing material and/or the continuous adhesive to have the properties desired it should not be highly crystalline, should not have a high proportion of hydrogen bonding and should include hydrophilic groups.

Evidences from various sources indicate that the average body loss of water through the skin excluding visible sweat is in the region of 250 g./sq. meter/24 hours. Areas such as the palm of the hand and soles of the feet have a high water loss in the region of 500 g./sq. meter/24 hours.

It follows that a permeability of at least 300 g./sq. meter/24 hours/40° C./80 percent R.H. is required for most areas but a figure of 500 is preferred especially for wound dressings and surgical drapes.

The adhesive may be applied as an allover spread (continuous or discontinous) to one surface of the backing material or the adhesive may be applied to body-adhering portions only to form for example a window dressing, i.e., one in which the wound-covering area of the backing material is not coated with adhesive.

It is clear that either the backing material or the adhesive, or both, may be continuous and nonpermeable to liquid water. All such arrangements have a number of common advantages, for example the moisture vapor permeability feature allows the skin etc., to breathe thereby preventing maceration and the impermeability to liquid water feature prevents ingress of water and egress of wound exudate where the material is used on a wound. The feature that both the adhesive and the backing material are unaffected by water allows the dressing to be immersed in water without adverse effect. Each of the three different embodiments of the invention, however, has its own particular advantages and the arrangement used for any particular purpose should be selected bearing in mind these advantages. For example, in embodiments where only the backing layer is continuous and impermeable to water, dirt and water are prevented from passing through the backing layer to the adhesive which may then allow the water and dirt to reach the body. The arrangement where only the adhesive is impermeable to water will prevent wound exudate from passing through the adhesive. The arrangement where both the adhesive and the backing material are continuous and impermeable to water is particularly preferred since this has the advantages given above for the arrangement where only one of the backing material and adhesive is continuous. Furthermore the manufacture of this embodiment is simplified since each of the layers may be produced in a continuous manner. Also the possibility of pinholes in the backing layer and the adhesive coinciding is less when two continuous layers are used since any such pinholes present are accidental. Furthermore strike-through of adhesive through the backing layer is prevented.

The expression "continuous" as used throughout the present specification, including the claims, is intended to mean that the material is such that it contains no discontinuities which are visible, either by the naked eye or under an optical microscope, and are such that water vapor passes through such materials by inter molecular diffusion. The polymer may be visualized as a tangled mass of polymer chains with approximately molecular sized holes between them. At normal temperatures there is considerable segmental mobility and the holes are continually forming and disappearing as a result of thermal motion. Diffusion of a penetrant takes place as a succession of "jumps" from hole to hole.

The diffusion of a gas or vapor through such a continuous material does not depend on the fluid properties of the gas or vapor but on the structures of the gas or vapor and the continuous material and chemical affinity of one for the other.

In the specification, including the claims the expression "unaffected by water" when used to describe the backing material and/or the adhesive is intended to mean that the backing material and/or adhesive does not on contact with water lose those properties which would effect its performance as a backing or adhesive, e.g., (a) the adhesive does not lose adhesion or cohesion due to solution and does not swell to cause the dressing etc., to come off and, (b) the backing does not lose its tensile strength, disintegrate or become tacky.

Where reference is made to moisture vapor permeability it is intended that such measurements are carried out by the Payne cup method, carried out as follows.

Ten ml. of distilled water are added to the cup. A 1¼inch diameter sample of the material to be tested is clamped above the opening from the cup. Where an adhesive is being tested this should first be coated onto a highly permeable backing for support. The arrangement is then placed in an air-circulating oven at temperatures of 40° C. and relative humidity of 20 percent for 24 hours. There is therefore a difference between the relative humidity inside the cup and the relative humidity outside the cup. The loss of water from the cup is found by weighing. The moisture vapor permeability is expressed as g./sq. meter/24 hours/40° C./80 percent R. H. for the particular material.

The expression "pressure-sensitive adhesive" as used throughout the specification, including the claims, is intended to mean an adhesive which is inherently tacky, viscoelastic and cohesive in its normal dry state. Clearly the adhesive used must be capable of adhering to that part of the body to which it is to be attached.

Where reference is made to adhesive being on "substantially the whole of the body-adhering portion of the backing material" it is not intended to exclude the possibility of the adhesive being discontinuous to an extent sufficient to provide the body-adhering portion with an average m.v.p. of at least 300.

The adhesive materials of the invention should be nontoxic, nonirritant, conformable and should maintain their properties over a range of conditions and time. The backing material should be nontacky under conditions of use.

The adhesive materials may be used on any part of the human body, e.g., for surgical, dermatological or cosmetic use. Some examples of specific uses of the adhesive material of the invention are as surgical drapes, suture strips and sheets, adhesive dressings, bandages, plasters, decorative nail coverings, solid eye liners, wrinkle producers (for theatrical make up) etc.

The adhesive materials of the present invention may result in the following advantages:

1. Prevent occlusion of moisture under the structure which can injure the skin or nail.
2. Allow oxygen through from the outside. This is important to healing of wounds.
3. Prevent ingress of liquid water.
4. Prevent ingress of bacteria.
5. Are unaffected by water.

Some degree of isotropic elasticity in the backing material is desirable for some applications. This is however not essential, and nonelastic backing materials such as cretane may be used, if desired.

Continuous adhesives may be formed from polymers containing hydrophilic groups such as hydroxyl, carboxyl, amine, amide, ether and alkoxy providing that the adhesives are not soluble or highly swollen in water.

However, water-soluble or water-swellable polymers can be added to pressure sensitive formulations provided they are compatible and do not cause the adhesives to be affected by water (for example a polyvinylmethyl ether may be added to a polyvinylethyl ether adhesive or a hydroxy propyl acrylate homopolymer may be added to a compatible pressure-sensitve adhesive); other water-soluble or water-swellable polymers which may be used are cellulose esters, polyvinyl alcohol and other hydrophilic materials. Similarly water-soluble monomers can be used in water-insensitive copolymers.

Examples of materials which may be used as the continuous adhesive are blends of vinyl ether or acrylic polymers, with or without the addition of tackifying resins. Hydroxy acrylate polymers may also be used in suitable formulations.

Preferred water-impermeable adhesives are polyvinyl ethyl ethers and certain acrylate ester copolymers containing hydrophilic groups.

The polyvinyl ethyl adhesives may be obtained in a wide range of viscosities. A particularly preferred polyvinly ethyl ether adhesive is a composition comprising the following ingredients:

| Ingredient. | Amount (Parts by weight except where stated). |
|---|---|
| Bakelite EDBC (see below) | 50 |
| Bakelite EHBM (see below) | 100 (solution as received) |
| Kelrez ZR 142 (see below) | 25 |
| Antioxidant (Nonex WSL) | 3 |
| 60-80 petroleum ether | 300 mls. |

Polyhydroxy propyl acrylate is a tacky rubbery polymer which may be converted into a pressure-sensitive adhesive composition by copolymerization. The homopolymers generally cross-link during polymerization but linear polymers may be obtained by solvent polymerization provided the concentration of monomer is low.

Suitable acrylate ester copolymer adhesives found so far are Acronal KR 2156 (B.A.S.F) and D.260 (Shawinigan). Blends of acrylic and polyvinyl ethers found to be useful as adhesives include (a) a mixture of 50 parts by weight Acronal 40D (B.A.S.F.) and 50 parts by weight Lutanol M 40, and (b) a mixture of 100 parts by weight Gantrez M 574, 50 parts by weight Gelva D 260 and 25 parts by weight of Kelrez ZR 142.

Where a continuous adhesive is used, the adhesive may be applied to the backing material in solution, aqueous dispersion, as a hot melt, or by a transfer process, using known techniques, e.g., knife, roller-coating or curtain coating methods. In practice the transfer process has been found to be particularly convenient. The adhesive solution is spread on release-coated paper, and almost dried before contacting the backing material under sufficient pressure to ensure good contact. The release paper is then removed. Other methods may however prove to be more practicable in commercial use.

Any suitable adhesive may be used where the adhesive is to be discontinuous. The discontinuities should not be too big, i.e., the adhesive layer should contact the skin etc., over most of the area of the dressing.

The adhesive can be made porous by foaming, leaching out soluble fillers, pattern spreading, e.g., as shown in British Pat. No. 819,635 spraying or selective layer perforating.

Where the backing material is continuous any material which is continuous and is water-vapor-permeable but liquid water impermeable may be used, although for many uses other properties, e.g., conformability and oxygen permeability, are desirable.

Useful materials include cast films of thermoplastic polyurethane and other polymers containing nonbound (free to interact with water) hydrophilic groups e.g., —OH, —COOH, —$NH_2$, —NH, alkoxy and ether etc.) provided they are unaffected by water, as defined above.

Preferred continuous backing materials are:

1. A copolymer obtainable by copolymerizing an hydroxy alkyl acrylate or methacrylate with an alkoxy alkyl acrylate or methacrylate and optionally with a minor amount of a further monomer.

Copolymers of this type are described in G.B. application No. 50,044/68.

If desired more than one hydroxyalkyl acrylate or methacrylate and/or more than one alkoxy alkyl acrylate or methacrylate may be used as monomers.

Preferably the minor amount of further monomer is no more than 10 percent by volume based on the total volume of monomers.

Preferred further monomers are acrylic acid methacrylic acid acrylamide, mono- and di- acrylates of glycols and poly glycols, (e.g. glycerol and polyalkylene glycols), mono- and di-methacrylates of glycols and polyglycols (e.g., glycerol and polyalkylene glycols, glycidyl acrylates and glycidyl methacrylates).

The further monomer or monomers may be present as an impurity in the major constituents of the reaction mixture or may be specifically added, e.g., to provide for cross-linking.

The preferred hydroxy alkyl acrylates and methacrylates are hydroxy ethyl methacrylates (HEMA), hydroxyl propyl acrylate (HPA) and hydroxy propyl methacrylate (HPMA).

Preferred alkoxy alkyl acrylates and methacrylates are ethoxy ethyl methacrylate (EEMA) and methoxy ethyl methacrylate (MEMA).

The properties of these copolymers will vary depending on the proportions of the various ingredients used to make up the copolymer. In general copolymers with a high proportion of alkoxy alkyl acrylate or methacrylate (e.g., EEMA) give flexible, high moisture-vapor-permeable non-water-swellable films at 20° C. whereas a high proportion of a hydroxy alkyl methacrylate (e.g., HEMA) will give high moisture-vapor-permeable brittle, water-swellable films (properties at 20° C.). For example, a copolymer made up from 80 percent by volume EEMA and 20 percent by volume (HEMA is flexible and is not affected by water, whereas a copolymer made up from 50 percent by volume EEMA and 50 percent by volume HEMA is brittle and is swollen by water.

Copolymers including more than 30 percent hydroxyl ethyl acrylate or methacrylate are affected by water and are thus not included as materials which can be used as backing materials in the present invention.

These copolymers may be prepared by copolymerizing an hydroxyalkyl acrylate or methacrylate with an alkoxy alkyl acrylate or methacrylate and optionally with a minor amount of a further monomer. A free radial initiator, for example, tertiary butyl peroctoate may be used. The reaction may be performed in a solvent such as ethyl acetate, industrial methylated spirits, ethanol, methanol, dimethyl formamide. The reaction is performed in an inert atmosphere under reflux for 8 hours. The copolymer may be precipitated by pouring into a nonsolvent such as petroleum ether.

Alternatively, the above reaction may be taken to near completion by refluxing, e.g., for 24 hours, to give a solution of the copolymer. Films may be formed from the solution of the copolymer by casting a solution of the copolymer onto a smooth surface, for example release-coated silicone paper or cast polypropylene, drying and stripping the film off the smooth surface. To improve strength characteristics the copolymers may be self-cross-linked by heating or may be cross-linked by the addition of a cross-linking agent or a catalyst. A copolymer of 80 percent by volume EEMA and 20 percent by volume HEMA may be partially self-cross-linked by heating at 120° C. for 1½ hours or longer in air atmosphere.

II. Homopolymers of alkoxy alkyl acrylates or methacrylates (linear or cross-linked) or from copolymers of one or more (preferably one) alkoxy alkyl acrylate or methacrylate with one or more (preferably one) alkyl acrylate or methacrylate.

The moisture vapor permeability is reduced as the proportion of alkyl acrylate or methacrylate is increased. Care should therefore be taken to ensure that, in the final product, the moisture vapor permeability is at least 300 by careful selection of the proporation of alkyl acrylate or methacrylate, the thickness of the backing material and the nature and thickness of the adhesive.

Preferred monomers are ethoxy ethyl methacrylate (EEMA); methoxy ethyl methacrylate (MEMA); methyl methacrylate (MMA).

III. A copolymer obtainable by reacting an alkoxy alkyl acrylate or methacrylate with a different alkoxy alkyl acrylate or methacrylate. Copolymers of this type are described in our GB application No. 60,754/68. Although it is preferred that no monomers other than alkoxy alkyl acrylates or methacrylates or polymers formed therefrom are present in the reaction mixture, up to 10 percent of further monomers (see list above under I) may be present.

Where reference is made to no monomers other than alkoxy alkyl acrylates or methacrylates or polymers being present, it is to be understood that the reaction mixture may include very small amounts of the free acids as impurities.

These copolymers may be produced by copolymerizing in an inert atmosphere an alkoxy alkyl acrylate or methacrylate with a different alkoxy alkyl acrylate or methacrylate.

The reaction may be performed in the presence of a free-radical initiator, for example, tertiary butyl peroctoate.

The reaction may be performed in the absence of a solvent or in the presence of a solvent, e.g., ethyl acetate, toluene, methanol or dimethyl formamide.

The copolymer may be precipitated by pouring into a nonsolvent such as petroleum ether. Alternatively the reaction may copolymer. Films may be formed from a solution of the copolymer by casting completion by heating drying for a suitable length of time e.g., for 24 hours, to give a solution of the copolymer by casting the solution onto a smooth surface, for example, release-coated silicone paper or cast polypropylene, drying and stripping the film from the smooth surface. The properties of the films and coatings of the copolymer of the invention depend on the type and proportion of the monomers. For example, copolymers of ethoxy ethyl methacrylate (EEMA) and methoxy ethyl methacrylate (MEMA) and containing a high proportion of MEMA will tend to be stiff and brittle at temperatures in the region of 5° C. whereas similar copolymers containing a large proportion of EEMA will be flexible.

IV. Thermoplastic polyurethane films. Suitable films can be made by extrusion or preferably by solvent casting. Suitable materials, and their production are described in U.S. Pat. No. 2,871,218. Estane 5701 and 5702 (B. F. Goodrich Co.) have been found to be particularly satisfactory. Estane 5702 has been found to be the most useful of these materials.

This material is best cast as a tetrahydrofuran or acetone solution.

Properties of a 1-mil thick film of Estane 5702 are:

MVP 1,620 g.s.m./24 hr.

$O_2$ permeability 4,880 cc./m.$^2$/Atmos./24 hr.

Tensile strength (p.s.i.) 5,300

Elongation 730 percent

Modulus at 300 percent extension (p.s.i.) $<500$

Hardness (Durometer A) 70

Low-temperature brittleness point (°F.) $<-100$

Where the backing material is not continuous any material having high moisture vapor permeability may be used provided it is not affected by water. In addition it is desirable for such backing material to be such that it acts as a screen for larger particles of solid materials such as dirt.

Examples of materials which may be used to form noncontinuous backing material are microporous films of plasticized polyvinyl chloride (process for making such microporous film of p.v.c. is described in U.K. specification No. 884,232), and certain nonwoven and woven and knitted porous fabrics. Fabrics which may be used as the backing material include nonwoven fabrics based on cellulose or synthetic polymer fibers which may be crimped and/or laid down in such a manner as to give an elastic fabric. A preferred type of fabric having the desirable properties of omnidirectional stretch combined with high porosity and high strength even when wet, is that type of fabric based on extruded composite synthetic fibers sold under the trade mark "Heterofil" by Imperial Chemical Industries Limited.

Several of the spun-bonded polyester fabrics marketed as "Reemay" fabrics by DuPont and similar fabrics by Bondina Ltd. are similarly suitable.

In some cases the adhesive may be applied directly to the backing materials. In other cases however a water-vapor-permeable tie coating continuous or discontinuous may be needed to obtain adequate keying between the adhesive and the backing material. For example acrylic and plasticized PVC films may be coated with some adhesives directly, without need for a primer coat, e.g., where the adhesive used is a polyvinyl ethyl ether a tie coating is not usually required. However when using a backing material which includes Nylon a primer coat is required in order to obtain adequate keying between the adhesive and backing material when wet. A suitable primer has been found to be a butadiene/vinylpyridine latex solid under the trade name "Gentac."

In some instances, when using a noncontinuous backing material the exposed surface of the backing material has been found to "fluff up" badly, as well as becoming soiled. Also there is a tendency for the adhesive to strike through the backing material, adding to the soiling problem. This may be overcome by applying a thin coat of a flexible and extensible material on the exposed surface of the backing material. In addition to consolidating the surface, this coating could also provide release properties useful when the product is used in a roll form, e.g., for bandaging and strapping. Suitable material which may be used are conventional release coats such as polystearyl methacrylate.

Where the material is to be used as a surgical dressing, a pad may be attached to the adhesive-coated surface of the material.

The dressing pad when used is of conventional type and may, if desired, be made in situ by flocking vertically orientated fibers onto the adhesive surface.

Preferably a protector is provided to cover the adhesive which protector may be removed from the material immediately prior to use.

The protector, when used, may be a smooth-release-coated paper, e.g., a silicone-release-coated paper, but other thin suitable films inert to the adhesive may be employed.

The continuous portion of the material of the invention preferably has a high oxygen permeability especially where the material of the invention is to be used as a wound dressing.

Where the adhesive material of the invention is being stored in such a manner that the adhesive can come into contact with the backing material, e.g., if stored in the form of a reel, precautions must be taken to ensure the adhesive does not strongly adhere to the backing material. For example, the backing material may be provided with a release coating or a protector may be applied over the adhesive surface. This release coating may also serve to reduce soiling of the film in use.

If desired the backing film or adhesive layer or both may be given a pattern of thinner areas, e.g., by embossing, to enhance the vapor and gas permeability of the layers.

One of the preferred uses of the present invention is in decorative cosmetic products, e.g., nail covers, eye liners, beauty spots, stage effects, e.g., wrinkle producers (attach to skin in stretched state).

the preferred backing films for use in nail covers are copolymers of EEMA/HEMA (provided the amount of HEMA does not exceed 30 percent; EEMA/HPMA; MEMA/EEMA; copolymers of MEMA with other monomers e.g., MEMA/HEMA; EEMA/MMA and homopolymers of MEMA. Particularly preferred are 80/20 (volume percent) and 75/25 (volume percent) copolymers of EEMA/HEMA; 90/10 (volume percent) and 80/20 (volume percent) copolymers of EEMA and MMA; and 80/20 (volume percent) copolymer of EEMA/HPMA; 50/50, 60/40 and 70/30 MEMA/EEMA copolymers; 90/10 (volume percent) and 80/20 (volume percent) copolymers of MEMA/-HEMA and cross-linked versions of these polymers. The film thickness is preferably from 1 to 3 mils.

The preferred adhesives for use in connection with the nail coves are polyvinyl ethyl ether based adhesives, continuous film adhesives and foamed porous adhesives. The adhesive is preferably applied in an amount of from 5 to 75 grams per square meter. Nail covers are preferably glossy although they can have a matt finish. The films and/or adhesive may be pigmented or dyed. The films may having printing on them.

The nail covers are conveniently made up as a kit of two sets of six individual nail covers mounted in a range of sizes on a stiff-release-coated card.

The nail covers are removed from the nails by peeling or wiping with a special solvent. The material state to be preferred for nail covers are also preferred for other decorative cosmetic products.

Another particularly preferred use of the present invention is in forming adhesive medical and surgical dressings including first aid dressings and ward dressings.

The absorbent pad is generally placed centrally on the adhesive face of the material and the whole is preferably covered by a film or release coated paper protector. If desired, the dressings may be placed in a sterile pack, e.g., one sterilized by ethylene oxide or by irradiation.

The preferred backing films and adhesives include those given in respect of the nail covers.

Other preferred backing materials are continuous thermoplastic polyurethane films, e.g., the Estanes (B. F. Goodrich) particularly Estane 5702 and 5701, and elastic fabrics coated with such materials or with poly EEMA. Preferred discontinuous backing materials are microporous p.v.c., spun-bonded nonwoven fabrics, elastic woven fabrics and knitted fabrics.

Another preferred use of the present invention is in surgical drapes. These are large flexible sheets which are provided with a continuous layer of adhesive on at least a part only of one surface.

Where only a part of one surface is coated, the adhesive-coated area may be varied with the design of the drape and a film or release-coated protector is generally applied to the adhesive-coated area. This protector is removed when it is desired to use the drape. Generally two uncoated margins are provided to enable the protector to be easily removed. Alternatively, the coated margins may be covered by a releasable protector strip. The drapes may be packaged as a roll in a sterile pack and the shape of the drape may be varied to suit particular parts of the body.

Preferred materials, including both the backing material and the adhesive, are the same as those given for the nail covers. Another preferred backing material is a polyurethane film.

If desired, a bacteriostat may be incorporated into the surgical drape to prevent growth of infectious bacteria on its surface.

If desired, part of the surgical drape may be reinforced, for example the backing film may be reinforced with a light-weight spun-bonded nonwoven fabric to prevent the film tearing or splitting, if particular strength is required.

The surgical drapes of the present invention have a number of advantages as set out below:

1. Moisture vapor and oxygen permeable, waterproof and bacteria proof.
2. They may be left in position on the body for long periods which if considered desirable, enables
   a. the drape to be adhered over the proposed area of operation and the incision line marked on the drape during the preoperative period.
   b. the incision to be made accurately through the drape, the drape prevents wound infection from the surrounding area and the cut edges reinforce the wound edges.
   c. the incision to be closed by surface suture strips and, if necessary, covered by an adhesive dressing (e.g., ward dressing) adhering to the surface of the drape and the whole assembly to be left in contact with the body surface until the incision is healed.

It may be convenient for the drape to be transparent to enable the wound to be observed during healing.

The drapes preferably have a matt surface to prevent light reflection especially for use in an operating theater.

Surgical drapes must be highly conformable to skin otherwise after an incision has been made the retraction of the skin from the incision would cause the drape to lift and allow blood etc., to pass between the drape and the skin. The backing material is preferably antistatic.

Another use of the present invention is in suture strips. At present wounds either caused by accident or caused during surgical treatment are generally closed by stitching. The present invention, however, provides small flexible strips which may be used to prevent a wound from opening up.

The strips should have sufficient rigidity and cohesive properties to achieve the desired result. The suture strips may be mounted on a release-coated paper or film strip and packaged in a sterile pack, such as a film or coated paper peel pack. The size and shape of the suture strips may, of course, be varied as desired. The following three forms have, however, been found to be of particular use.

1. Thin strips, e.g., one-eighth of an inch × 3 inch mounted in multiples of 5 or 10 on release-coated rectangular strip.
2. Rectangular strips, e.g., one-fourth of an inch × 2 inch with a central absorbent pad, nonadherent strip or a central reinforced area either mounted in groups on a release-coated sheet or individually wrapped with a protective facing.
3. A "butterfly" shape, i.e., wide ends and narrow waist either mounted in groups on a release-coated sheet or individually wrapped with a protective facing.

Preferred backing materials for use in the production of the suture strips are the same as those given for the surgical dressings.

Preferred adhesives are polyvinyl ethyl ethers.

The suture strips may be wholly or partially reinforced with woven or nonwoven fabrics, for example spun-bonded fabrics such a Reemay (as sold by E. I. Dupont de Nemours) I.C.I.), fabrics formed from Heterofil fibers (as marketed by I.C.I.). A fabric reinforcement may be present in any layer of the suture strip, for example on the uncoated film surface.

The suture strips preferably have a small amount of elasticity to aid closure of the wound. The strip is adhered to one side of the wound and is then held under tension while adhering to the other side of the wound.

The suture strips of the present invention have a number of advantages as set out below.

1. The moisture vapor and gas permeability properties enable the strips to be left in position for as long as 10 days without irritation and trauma of the skin.
2. Waterproof properties prevent removal by external water or wound exudate.
3. The strips may be used for tissue grafts.

Another particular preferred use of the present invention is in elastic adhesive bandages and strapping tapes. These products comprise lengths of the adhesive material described above and are generally in the form of reels. Since in some cases the adhesive will tend to adhere strongly to the backing material when in reel form, it is desirable to use either a release coat on the backing material or a protector on the adhesive.

The preferred continuous backing materials for strapping tapes are films of copolymers of EEMA/HEMA; EEMA/HPMA; EEMA/MMA MEMA/HEMA and EEMA/MEMA reinforced by woven or nonwoven fabrics. Preferred discontinuous backing materials for strapping tapes include woven and nonwoven fabrics with good tensile strength.

The preferred backing materials for elastic bandages are knitted fabrics, e.g., knitted nylon, fabrics containing elastic threads, and high-twist cotton fabrics (elastic bandages) which may be coated with poly-ethoxy ethyl methacrylate or thermoplastic polyurethane.

The preferred adhesive is polyvinyl ethyl ether.

The backing material for the elastic bandages preferably has a high degree of stretch with good recovery properties whereas when used as a strapping tape the backing material is preferably more rigid, although it must still be flexible.

The main advantage with the bandages and strapping tapes is that they are waterproof yet moisture vapor and gas permeable thus allowing the bandages or tapes to be adhered to the skin without irritation or trauma developing.

IN THE DRAWINGS

FIG. 1 is described in connection with Example 16.

Figure 2:
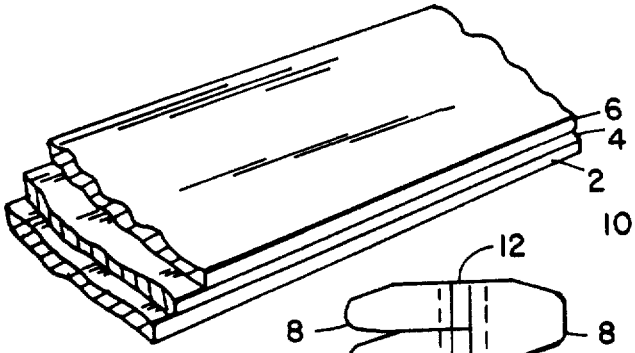
FIG. 2 is a diagrammatic sketch of an adhesive material in accordance with the invention.

In FIG. 2 an adhesive material is shown comprising a backing material 2, which may or may not be continuous and an adhesive 4 which may be continuous or discontinuous on one surface of the backing material 2. At least one of the backing material and the adhesive is continuous. As shown in FIG. 2 a protector, removable for use is provided for the adhesive although this is optional. By making the backing from an elastic material, an elastic bandage or tape may be obtained. The adhesive material of FIG. 2 is in the form of an adhesive tape.

Figure 1:
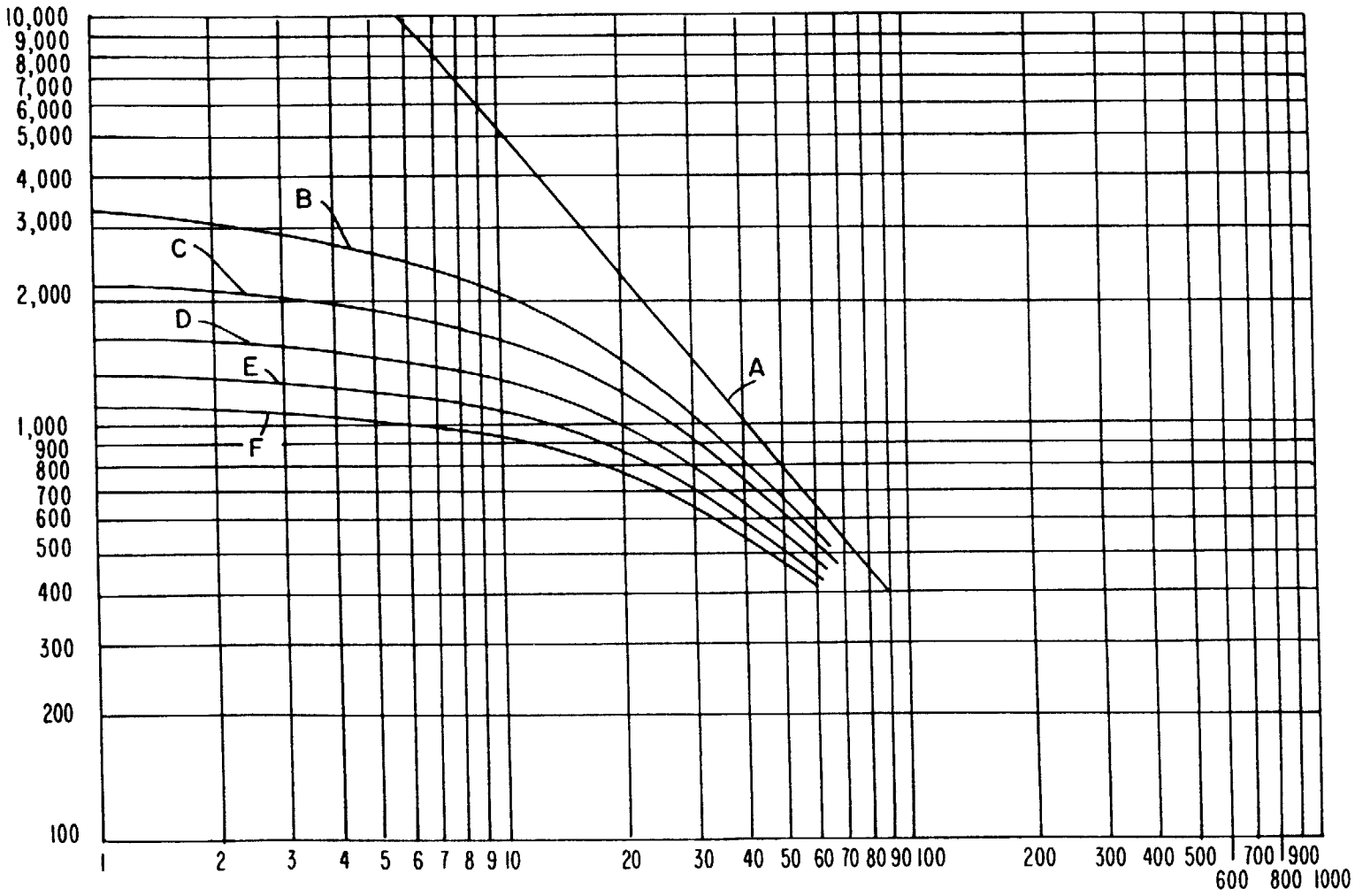
FIG. 1 is a graph showing, for one form of the adhesive material of the invention, the relationship between moisture vapor permeability and thickness of backing material and amount of adhesive.
Figure 3:
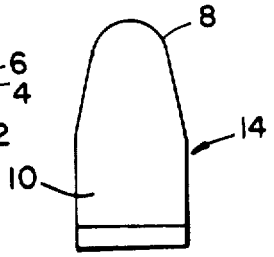
FIG. 3 is a diagrammatic sketch of a nail cover in accordance with the invention.
Figure 4:
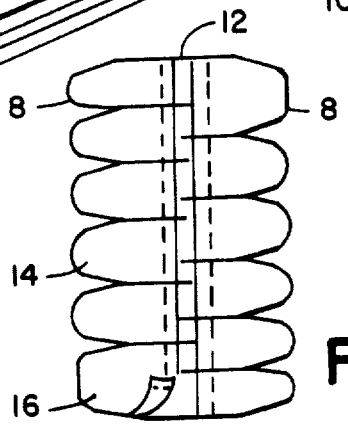
FIG. 4 is a diagrammatic sketch of a number of nail covers mounted on a single mounting.

In FIG. 3 there is shown a nail cover 14 of the invention. The nail cover includes a backing material, an adhesive and a protector 6 as in the material of FIG. 1 and has a cuticle-contacting curved portion 8 and a body portion 10. The protector is removed and the cover applied to the nail. The material used should be such that the cover will conform to the curvature of the nail. When the cover has been applied to the nail the squared end of the portion 10 is trained to the desired length and shape. If desired the nail covers may be produced as a set (see FIG. 4) mounted on a common mounting the mounting 12 replaces the protector. The individual nail covers 14 on the mounting 12 are of cuticle-contacting portions of the covers one of varying radii and six covers are provided for each hand to enable selection of the current radius cuticle-contacting portion to be selected. The covers are removed from the mounting for use. A strip of a protective material 16 which is subsequently removed may be provided on each nail cover 14 to enable it to be easily removed from the mounting 12 and for ease of handling.

Figure 5:
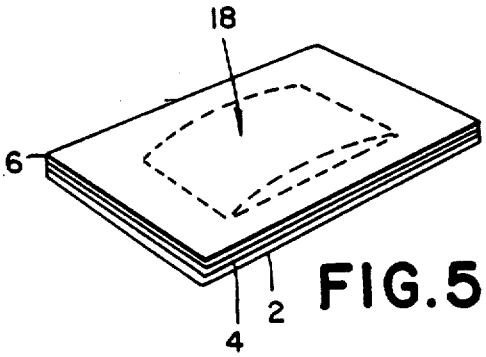
FIG. 5 is a diagrammatic sketch of an adhesive medical or surgical dressing in accordance with the invention.

FIG. 5 shows an adhesive medical or surgical dressing of the invention. This comprises a backing material 2 and an adhesive 4 as in the arrangement of FIG. 1. A dressing pad 18 is situated roughly centrally of the dressing on the adhesive side. A protector is provided to cover the pad and adhesive. The protector is removed when the dressing is required for use.

Figure 6:
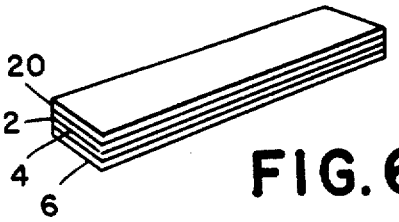
FIG. 6 is a diagrammatic sketch of a suture strip in accordance with the invention.

FIG. 6 shows a suture strip of the invention. This comprises a narrow strip of pressure-sensitive adhesive material including a backing material 2 and an adhesive 4. A fabric reinforcement 20 is provided on the uncoated side of the backing material. A protector 6 covers the adhesive side and is removed when the strip is to be used to prevent a wound from opening up.

Figure 7:
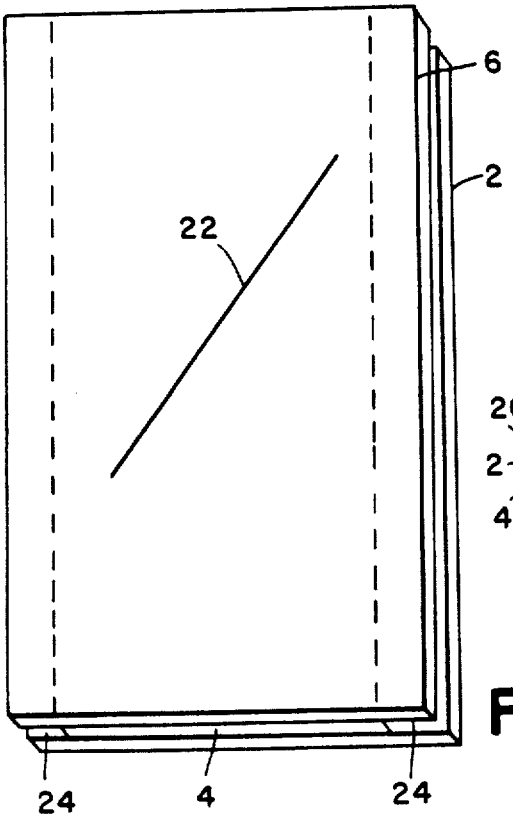
FIG. 7 is a diagrammatic sketch of a surgical drape in accordance with the invention.

FIG. 7 shows a surgical drape of the invention comprising a backing material 2 and an adhesive 4. The incision line is marked on the drape as at 22. A removable protector 6 is provided by adhesives to facilitate removal of the protector 6.

Material similar to those shown in FIGS. 2 to 7 may be used for various other purposes. For example by using different shaped adhesive materials comprising a backing and an adhesive other decorative cosmetic products such as beauty spots and eye liners may be formed. Also by using an elastic backing material a wrinkle producer for stage effect may be obtained. The material is stretched adhered to the skin and allowed to contract causing a wrinkle effect.

The invention will now be described with reference to the following examples. In these examples where reference is made to moisture vapor permeabilities the units are g./sq. meter/24 hrs./40° C./80 percent RH.

EXAMPLE 1

One surface of a backing material in the form of a lightweight fabric (weight 1 oz./sq.yd) formed from "Heterofil" fibers based on Nylon was given a primer coat of "Gentac" and adhesive composition A (described below) was then applied to the primer coated surface of the fabric in an amount of 75 g./sq. meter. The moisture vapor permeability of the adhesive material so produced was 500.

The adhesive coated material was made into first aid dressings but cutting to an appropriate size and applying a pad to part of the adhesive surface. The dressing gave satisfactory results and did not produce skin maceration due to having too low a moisture vapor permeability.

EXAMPLE 2

One surface of a backing material in the form of a lightweight fabric (weight 1 oz./sq.yd.) formed from Heterofil fibers based on Nylon was given a primer coat of "Gentac" and adhesive composition B (described below) was then applied to the primer-coated surface of the fabric in an amount of 70 g./sq. meter. The moisture vapor permeability of the adhesive material so produced was 835.

The adhesive-coated material was made into first aid dressings by cutting to an appropriate size and applying a pad to part of the adhesive surface. The dressing gave satisfactory results and did not produce skin maceration due to having too low a moisture vapor permeability.

EXAMPLE 3

An adhesive composition was prepared by dissolving a copolymer (Shawinigan D 260) of acrylic esters in a solvent system consisting of toluene/Hexane/ethyl acetate. This adhesive was knife-coated on to a microporous poly vinyl chloride foil having a moisture vapor permeability of 4,500. Dry coating weight was 50 g./sq.m. Dressings made from this showed a moisture vapor permeability of 550 and adhered well to skin.

No skin maceration developed in user trials.

EXAMPLE 4

The moisture vapor permeability of the adhesive of Example 3 was increased by the addition of a poly methyl vinyl ether. (Lutanol M40).

A 50/50 blend on a solids basis was knife-coated on to microporous P.V.C. foil at a dry coating weight of 75 g./sq.m. Dressings made from this had a moisture vapor permeability of 780. The dressings performed well in user trials, although adhesives based on methyl vinyl ethers alone were not expected to possess sufficient water resistance for this purpose.

EXAMPLE 5

Adhesive composition C (described below) was knife-coated on to microporous P.V.C. foil at a dry coating weight of 72 g./sq.m.

This gave dressings having moisture vapor permeability higher than that given by a similar formulation based on ethyl vinyl ethers without the poly hydroxy propyl acrylate (HPA), e.g., a moisture vapor permeability 555 was increased to 667 by this addition of HPA.

EXAMPLE 6

A cast film 0.0025 inch thick and consisting of a copolymer of 80 percent by volume EEMA and 20 percent by volume HEMA with its casting paper still attached was spread with a solvent-based polyvinyl ethyl ether pressure-sensitive adhesive (adhesive composition A). The amount of adhesive was 16 grams per square meter. The adhesive was then dried in an oven and the coated film mounted on to a release-coated paper protector. The casting paper was then removed and the laminate made into a kit of individual nail covers. The film alone had a moisture vapor permeability of 1,400, the adhesive a moisture vapor permeability of 3,000 and the completed nail cover a moisture vapor permeability of 960.

A trial showed that the nail covers performed adequately and did not cause damage to the nail.

EXAMPLE 7

A first aid dressing was made up using a 0.002-inch cast film (copolymer of 20 percent by volume HEMA and 80 percent by volume EEMA) and the film coated with 30 grams per sq. meter of a polyvinyl ethyl ether adhesive (adhesive composition A). A protector consisting of a low-release silicon-coated parchment (No. E1952 as marketed by Leonard Stace Ltd.) was applied to the adhesive surface of the dressing which had a moisture vapor permeability of 690.

EXAMPLE 8

A surgical drape was made up by coating a 0.002-inch thick cast film (20 percent by volume HEMA 80 percent by volume EEMA copolymer with 16 grams per square meter of a polyvinyl ethyl ether adhesive (adhesive composition A). The marginal edges on two opposed parallel sides were left unspread. A silicone-release-coated paper was applied to the adhesive as a protector. The moisture vapor permeability of the surgical drape (excluding the protector) was 1,080.

EXAMPLE 9

A 1.6 oz. per square yard spun-bonded nonwoven fabric (Reemay type 2415) was laminated to an 0.002-inch thick cast film (copolymer of 20 percent by volume HEMA and 80 percent by volume EEMA). The film side was then coated with 90 grams per square meter of a polyvinyl ethyl ether adhesive (adhesive coposition A) and a release-coated card was then applied to the adhesive surface. The resulting laminate was split into one-eighth of an inch by 3 inch strips which were then packed in a peel pack to be used as suture strips. The suture strips had a moisture vapor permeability of 340.

EXAMPLE 10

A cast film 0.0025 of an inch thick and consisting of a copolymer made by copolymerizing a mixture 50 percent by volume EEMA and 50 percent by volume MEMA with its casting paper still attached was spread with a solvent-based polyvinyl ethyl ether pressure-sensitive adhesive (adhesive composition A). The amount of adhesive was 16 grams per square meter. The adhesive was then dried in an oven and the coated film mounted on to a release-coated paper protector. The casting paper was then removed and the laminate made into a kit of individual nail covers. The nail covers (excluding the protector) had a moisture vapor permeability of 940.

Nail covers in accordance with this example were given to 20 volunteers and used for 72 hours or more.

Examination of the nails showed that no significant nail damage occurred when compared with a conventional nitrocellulose lacquer used as a control. The nail covers had an excellent appearance and did not cause any irritation.

EXAMPLE 11

A first aid dressing was made up using a 0.002-inch cast film (of a copolymer obtained by copolymerizing a mixture of 50 percent by volume MEMA and 50 percent by volume EEMA) and the film coated with 30 grams per sq. meter of a polyvinyl ethyl ether adhesive (adhesive composition A). A protector consisting of a low-release silicone-coated parchment (No. E 1952 as marketed by Leonard Stace Ltd.) was applied to the adhesive surface of the dressing.

The dressing (excluding protector) had a moisture vapor permeability of 780.

EXAMPLE 12

A surgical drape was made up by coating a 0.002-inch thick cast film (of a copolymer obtained by copolymerizing a mixture of 50 percent by volume MEMA 50 percent by volume EEMA) with 16 grams per sq. meter of a polyvinyl ethyl ether adhesive (adhesive composition A). The marginal edges on two opposed parallel sides were left unspread. A silicone-release-coated paper was applied to the adhesive as a protector. The drape (excluding protector) had a moisture vapor permeability of 1080.

EXAMPLE 13

A 1.6 oz. per square yard spun-bonded nonwoven fabric (Reemay type 2415) was laminated to an 0.002-inch thick cast film (of a copolymer obtained by copolymerizing a mixture of 50 percent by volume MEMA and 50 percent by volume EEMA). The film side was then coated with 90 grams per square meter of a polyvinyl ethyl ether adhesive (adhesive composition A) and a release-coated card was then applied to the adhesive surface. The resulting laminate was split into one-eighth of an inch by 3 inch strips which were then packed in a peel pack to be used as suture strips. The suture strips (excluding protector) had a moisture vapor permeability of 350.

EXAMPLE 14

Adhesive composition D (see below) was knife-coated onto a silicone-coated release paper, to give a dry coating weight of 60 g.s.m. After drying, a spun-bonded fabric (Reemay 2415) was laminated to the adhesive and the release paper stripped away. Small dressing pads were placed on the adhesive, and first aid dressings cut out.

The dressings had a moisture vapor permeability of 1,100, adhered satisfactorily to human skin, and did not cause skin maceration or irritation.

EXAMPLE 15

Adhesive composition E (see below) was knife-coated onto a release paper to give 40 g.s.m. dry coating weight. The dry adhesive w was transferred by lamination to a nonwoven spun-bonded polyester fabric having an appreciable degree of stretch and recovery (No. 1520 by Bondina Ltd).

This was then cut into strips 3 inches wide by 3 yards long and rolled up with a silicone paper interleaf for use as adhesive compression bandages. These bandages had a M.C.P. of 110 units.

EXAMPLE 16

Adhesive materials were prepared from a backing material of a polymer obtained by copolymerizing a 50/50 mixture of EEMA/MEMA and adhesive composition A (see below). The accompanying drawing shows the moisture vapor permeability of these various films in the form of a graph (log/log scale) in which moisture vapor permeability (along the ordinate or y-axis) is plotted against mass of adhesive (along the abscissa or x-axis) (g./sq. meter for the adhesive alone (line A), the adhesive on 0.001-inch (line B); 0.0015-inch (line C) 0.002-inch (line D); 0.0025-inch (line E) and 0.0030-inch (line F) backings.

EXAMPLE 17

A self-cross-linking acrylic ester copolymer in ethyl acetate solution (Acronal KR 2156 supplied by BASF) was reverse-roll-coated onto a 1-mil thick polyurethane film (Estane 5702 solution cast) to give a dry coating weight of 60 g.s.m.

The polyurethane film, with the wet coating of adhesive solution was passed through a hot-air-drying tunnel at 75° C. which caused the adhesive to foam up as it dried.

At the reel up, a siliconized paper interleaf was laminated to the adhesive, passing through nip rollers applying sufficient pressure to burst much of the foam (50 p.s.i. on the actuating cylinders of a Dixon coater model 160, 12 inch wide).

Samples of film/adhesive tested for MVP gave a figure of 820.

Similar film coated with Acronal KR 2156, but not foamed, gave an MVP figure of 550 units.

EXAMPLE 18

A surgical drape was made up by coating a 0.0032-inch (±0.0002-inch) thick cast film of a copolymer obtained by copolymerizing a mixture of 50 percent by volume MEMA and 50 percent by volume EEMA with 50 g./sq. meter of adhesive composition A. The marginal edges on two opposed parallel sides were left unspread. A silicone-release-coated paper was applied to the adhesive as a protector. The surgical drape (excluding protector) had the following properties.

| | |
|---|---|
| Moisture vapor permeability | 525 ± 25 |
| Tensile strength | 2.2 ± 0.3 lb./in |
| Yield point | 1.7 ± 0.1 lb./in |
| Elongation at break | 300 ± 40% |

EXAMPLE 19

Example 10 was repeated using a 0.0021-inch (±0.0002-inch) film and an adhesive spread of 18 g./sq. meter.

The moisture vapor permeability of the film alone was 1,800 and of the film coated with adhesive was 1,050.

EXAMPLE 20

A 0.011-inch microporous plasticized PVC film was given 60 g.s.m. coating of adhesive composition A by transfer from a silicone-release-coated paper. The coated film was made up into small first aid dressings and used in a clinical trial on volunteers for healing cuts, abrasions and blisters on the fingers. Of the 500 dressings used only 3 showed signs of maceration, attributed to lifting and ingress of water. In all other cases the wound healing was satisfactory over the periods of inspection varying from 5 hours to 3 days.

The dressings had a moisture vapor permeability of 600.

It will be appreciated that the materials used in the examples are for illustration only and many other materials could be used, e.g., the 50/50 EEMA/MEMA copolymer used in Examples 12 to 15 could be replaced by say a 70/30 MEMA/EEMA or 60/40 MEMA/EEMA copolymer.

The following are adhesive compositions used in many of the above examples.

ADHESIVE COMPOSITION A

| | | |
|---|---|---|
| Bakelite EDBC | 50 | parts by weight |
| Bakelite EHBM | 100 | parts by weight (of solution as received) |
| Kelrez ZR142 | 25 | parts by weight |
| Antioxidant (Nonex WSL | 3 | parts of weight |
| 60–80 petroleum ether | 300 | ml. |

The Bakelite EDBC and the Bakelite EHBM were mixed together in a two-blade mixer and the Nonex WSL and Kelrez ZR 142 was added as a 25 percent solution in a portion of the petroleum ether. When the mass had been thoroughly mixed it was diluted to working viscosity using the rest of the petroleum ether.

This polyvinyl ethyl ether adhesive has an oxygen permeability, when coated as a 0.0126-inch layer (70–74 g./sq. meter) on a microporous P.V.C. base, of 5,000 cc./sq. meter/24 hours/atms.

ADHESIVE COMPOSITION B

An adhesive composition was prepared by dissolving in 60 to 80 petroleum ether solvent, the following ingredients:

| | |
|---|---|
| Bakelite EHBM | 1 part by weight |
| Bakelite EDBC | 1 part by weight (of solution |

-continued

| | |
|---|---|
| Kelrez ZR 142 | received) 0.5 parts by weight |

ADHESIVE COMPOSITION C

This adhesive was prepared from the following ingredients:

| | Parts by weight |
|---|---|
| Bakelite EDBC | 30 |
| Bakelite EHBM | 85.2 |
| Kelrez ZR 142 | 15.35 |
| Poly hydroxy propyl acrylate | 33.35 |
| Ethanol | 130 |
| 60/80 petroleum ether to | 40% solids. |

ADHESIVE COMPOSITION D

An adhesive was made up to the following formulation:

| | parts by weight |
|---|---|
| Acronal 40D | 50 |
| Lutonal M40 (aq.) | 50 |

This adhesive had the following properties

| | |
|---|---|
| Williams plasticity $K_2^{40}$ | 273 |
| Peel adhesion to steel at 60 g.s.m. (T0 B.S.2.110)530 g/cm. width | |

Moisture vapor permeability at 60 g.s.m. (on film with water vapor permeability of 1915); 1075.

ADHESIVE COMPOSITION E

An adhesive was made up to the following formulation:

| | Parts by weight |
|---|---|
| Gantrez M 574 | 100 |
| Gelva D 260 | 20 |
| Kelrez ZR 142 | 25 |

The following test results were obtained at 60 g.s.m. coating weight:

| | |
|---|---|
| Williams plasticity $K_2^{40}$ | 120 |
| Moisture permeability (on film of M.V.P. 1919) | 752 |

The following are descriptions of some of the materials referred to in the general description and in the examples.

Bakelite Resin EHBM is a poly (vinyl ethyl ether) high-viscosity resin having 25 percent non-volatiles in hexane, a reduced viscosity at 20° C. of 4.0±0.5; a plasticity of 1.6 to 2.0 mm.; a flashpoint <20° F.; a specific gravity of C. 7,299 and a weight per gallon of 6.07 lbs.

Bakelite Resin EDBC is a poly (vinyl ethyl ether) low-viscosity resin having 98 percent nonvolatiles; a reduced viscosity at 20° C. of 0.3±0.1; a specific gravity at 20° C. of 0.973 and a weight per gallon of 8.12 lbs.

Kelrez ZR142 is a zinc resinate formed by the interaction of zinc oxides with the resin acids in partially dimerized Colophony, contains 9.6 percent zinc and has a melting point of 160° to 165° C.

Acronal 40 D is an aqueous dispersion of acrylic polymers (50 percent solids) sold by B.A.S.F.

Lutonal M40 (aq.) is a soft polymer of methyl vinyl ether dissolved in water (50 percent solids) sold by B.A.S.F.

Gantrez M574 is a solution of polymethyl vinyl ether sold by General Aniline and Film Corporation.

Gelva D260 is a solution of copolymers of acrylic alkyl esters sold by General Aniline and Film Corporation.

Gentac is a butadiene/vinyl-pyridine copolymer latex.

NONOX is a phenol condensate.

ESTANE is a linear polyrethane elastomer.

REEMAY is a nonwoven fabric formed from a polyester spun-bonded filament.

HETEROFIL is a staple fiber of filament comprising a polymeric core and outer layer of a polymer of lower melting point than that of the inner layer. The polymer is a polyamide in the case of both the core and the outer layer and the core and outer layer may both be derived from the same monomer but will have different molecular weights in order to produce the different melting points.

The EEMA used in Examples 8 to 15 contained 2-ethoxy ethyl methacrylate for the most part together with a very small proportion of acid as an impurity.

The HEMA used in Examples 8 to 11 contained 2-hydroxy ethyl methacrylate for the most part, together with a small amount of di-ethylene glycol monomethacrylate, ethylene glycol dimethacrylate and methacrylic acid as impurities.

The EEMA/HEMA copolymer film of Example 10 has an oxygen permeability transmission rate when measured according to B.S. 2,782; 1,965 method 514 A, was found to be 5,000 ml./sq.meter/24 hours/Atms./-thou. thickness.

The poly hydroxy propyl acrylate was prepared by polymerizing hydroxy propyl acrylate in ethanol using benzoyl peroxide catalyst to give a solid rubbery polymer soluble in ethanol.

The moisture vapor permeabilities of a number of the continuous backing materials used in accordance with the present invention are given below:

| Film | Thickness (× 0.001") | Moisture vapor permeability g./sq.m./24 hrs at 40° C. & 80% RH) |
|---|---|---|
| EEMA | 4.5 | 880 |
| EEMA/HEMA (80:20) | 2.5 | 1400 |
| EEMA/Methyl Methacrylate (80:20) | 2.5 | 1020 |
| MEMA | 4.3 | 1140 |
| MEMA/Methyl Methacrylate (90:10) | 2.0 | 1650 |
| MEMA/HEMA (90:10) | 1.5 | 2460 |
| MEMA/EEMA (50:50) | 2.1 | 1800 |
| MEMA/HEMA (70:30) | 2.7 | 1650 |

We claim:

1. A moisture-vapour-permeable pressure-sensitive adhesive material for use on [animal] *human* skin [and nails,] comprising a *continuous* backing material, *which is an unreinforced thermoplastic polyurethane film* and a

*continuous* pressure-sensitive adhesive on at least substantially the whole of the body-adhering portion of at least one surface of said *continuous* backing material, both said *continuous* backing material and said *continuous* adhesive being [moisture-vapour-permeable and-]*oxygen-permeable*, [and at least on of said backing material and said adhesive comprising a] synthetic polymer [and being continuous] *which are moisture vapour permeable*, unaffected by water and nonpermeable to liquid water, said adhesive material having a moisture vapor permeability of at least [300] *500* g./sq. meter/24 hours/40° C./80 percent RH.

[2. A pressure-sensitive adhesive material as claimed in claim 1, which has a moisture vapor permeability of at least 500 g./sq. meter/24 hours at 40° C. and 80 percent RH.]

[3. A pressure-sensitive adhesive material as claimed in claim 1, which is oxygen-permeable.]

[4. A pressure-sensitive adhesive material as claimed in claim 1, wherein the backing material is continuous and the adhesive is not continuous.]

5. A pressure-sensitive adhesive material as claimed in claim 1, which is [in the form of] a surgical drape[, suture strip or sheet, adhesive] *or wound* dressing[, bandage, plaster, strapping tape, decorative nail covering, or decorative cosmetic product].

6. A moisture-vapour-permeable pressure-sensitive adhesive material for use on [animal] *human* skin [and nails] comprising a *continuous* backing material *which is an unreinforced thermoplastic polyurethane film* and a *continous* pressure-sensitive adhesive *selected from the group consisting of polyvinyl ethyl ethers or acrylic ester copolymers containing hydrophilic groups* on at least substantially the whole of the body-adhering portion of at least one surface of said *continuous* backing material, both said *continuous* backing material and said *continuous* adhesive being moisture-vapour-permeable [and] *synthetic polymers which are* unaffected by water and [and at least said adhesive comprising a synthetic polymer and being continuous and] *are* nonpermeable to liquid water, said adhesive material having a moisture vapor permeability of at least [300] *500* g./sq. meter/24 hours/40° C./80 percent RH.

[7. A pressure-sensitive adhesive as claimed in claim 6 wherein the adhesive is a polyvinyl ethyl ethers or an acrylic ester copolymer containing hydrophilic groups.]

[8. A pressure-sensitive adhesive material as claimed in claim 6 wherein the backing material is noncontinuous.]

[9. A pressure-sensitive adhesive material as claimed in claim 8 wherein the backing material is a microporous film of plasticized polyvinyl chloride or nonwoven fabric.]

[10. A pressure-sensitive adhesive material as claimed in claim 9, wherein the nonwoven fabric is based on cellulose or synthetic polymer fibers which may be crimped and/or laid down in such a manner as to give an elastic fabric.]

[11. A pressure-sensitive adhesive material as claimed in claim 10, wherein the fabric comprises extruded composite synthetic fibers or a spun-bonded polyester fabric.]

12. A moisture-vapour-permeable pressure-sensitive adhesive material for use on animal skin and nails, comprising a backing material *which is an unreinforced thermoplastic polyurethane film* having a pressure-sensitive adhesive on at least substantially the whole of the body-adhering portion of at least one surface of said backing material, both said backing material and said adhesive being moisture-vapour-permeable and unaffected by water and both said backing material and said adhesive comprising a synthetic polymer and being continuous and nonpermeable to liquid water, said adhesive material having a moisture vapor permeability of at least 300 g./sq. meter/24 hours/ 40° C./80 percent RH.

[13. A pressure-sensitive adhesive material as claimed in claim 12 wherein the backing material comprises a copolymer obtainable by copolymerizing an hydroxy alkyl acrylate or methacrylate with an alkoxy alkyl acrylate or methacrylate and optionally with a minor amount of a further monomer.]

[14. A pressure-sensitive adhesive material as claimed in claim 12, wherein the backing material comprises a homopolymer of ethoxy ethyl methacrylate or methoxy ethyl methacrylate or a copolymer of methyl methacrylate with ethoxy ethyl methacrylate or methoxy ethyl methacrylate.]

[15. A pressure-sensitive adhesive material as claimed in claim 12 wherein the backing material comprises a thermoplastic polyurethane film.]

16. A pressure-sensitive-adhesive material as claimed in claim 12, wherein the adhesive *is* [comprises] a polyvinyl ethyl ether.

17. A pressure-sensitive adhesive material as claimed in claim 12 which is [in the form of a nail cover,] a medical or surgical dressing[,] *or* a surgical drape[, a suture strip, an elastic adhesive bandage or a strapping tape].

[18. A pressure-sensitive adhesive material as claimed in claim 12, which is in the form of a nail cover and the backing material has a thickness of from 1 to 3 mils.]

[19. A pressure-sensitive adhesive material as claimed in claim 17 which is in the form of a nail cover and in which the adhesive is applied in an amount of from 5 to 75 grams per square meter.]

[20. A pressure-sensitive adhesive material as claimed in claim 12 wherein the backing material comprises a copolymer obtainable by reacting an alkoxy alkyl acrylate or methacrylate with a different alkoxy alkyl acrylate or methacrylate, no monomers other than alkoxy alkyl acrylates or methacrylates or polymers formed therefrom being present in the reaction mixture.]

[21. A pressure-sensitive adhesive material as claimed in claim 20, wherein the backing material comprises a copolymer of ethoxyethyl methacrylate and methoxy ethyl methacrylate.]

[22. A pressure-sensitive adhesive material as claimed in claim 21, wherein the backing material comprises a 50/50, 60/40 or 70/30 copolymer of MEMA/EEMA.]

[23. A pressure-sensitive adhesive material as claimed in claim 20 wherein the adhesive comprises a polyvinyl ethyl ether.]

[24. A pressure-sensitive adhesive material as claimed in claim 20 which is in the form of a suture strip and which is wholly or partially reinforced with woven or nonwoven fabrics.]

[25. A pressure-sensitive adhesive material as claimed in claim 13 wherein said hydroxy alkyl acrylate or said methoacrylate comprises hydroxy ethyl methacrylate, hydroxy propyl acrylate, or hydroxy propyl methacrylate, and wherein said alkoxy alkyl acrylate or methacrylate comprises ethoxy ethyl methacrylate or methoxy ethyl methacrylate.]

[26. A pressure-sensitive adhesive material as claimed in claim 17 in which the backing material is reinforced by a nonwoven material.]

*27. A pressure-sensitive adhesive material as claimed in claim 1 which is a surgical drape.*

*28. A pressure-sensitive adhesive material as claimed in claim 1 which is an adhesive dressing.*

*29. A pressure-sensitive adhesive material as claimed in claim 12 which is a medical dressing.*

*30. A pressure-sensitive adhesive material as claimed in claim 12 which is a surgical dressing.*

*31. A pressure-sensitive adhesive material as claimed in claim 12 which is a surgical drape.*

*32. A pressure-sensitive adhesive as claimed in claim 1 wherein the adhesive is a polyvinyl ethyl ether.*

*33. A pressure-sensitive adhesive as claimed in claim 1 wherein the adhesive is an acrylic ester copolymer containing hydrophilic groups.*

*34. A pressure sensitive adhesive material as claimed in claim 16 which is a wound dressing or surgical drape.*

*35. A pressure sensitive adhesive material as claimed in claim 12 wherein the adhesive is an acrylic polymer.*

*36. A pressure sensitive adhesive material as claimed in claim 12 wherein the adhesive is an acrylic ester copolymer containing hydrophilic groups.*

* * * * *